United States Patent [19]

Yokota et al.

[11] Patent Number: 4,793,842
[45] Date of Patent: Dec. 27, 1988

[54] METHOD FOR PRODUCING GLASS PREFORM FOR OPTICAL FIBER

[75] Inventors: Hiroshi Yokota; Hiroo Kanamori; Gotaro Tanaka; Hiroshi Suganuma; Toshio Danzuka, all of Yokohama, Japan

[73] Assignee: Sumitomo Electric Industries, Ltd., Osaka, Japan

[21] Appl. No.: 139,141

[22] Filed: Dec. 21, 1987

Related U.S. Application Data

[63] Continuation of Ser. No. 847,319, Apr. 2, 1986, abandoned.

[30] Foreign Application Priority Data

Apr. 3, 1985 [JP] Japan .................. 60-69203

[51] Int. Cl.$^4$ .................... C03B 37/014; C03B 37/027
[52] U.S. Cl. ...................................... 65/3.11; 65/900; 65/DIG. 16
[58] Field of Search ............... 65/3.12, 3.11, DIG. 16, 65/3.15, 18.2, 900; 427/163

[56] References Cited

U.S. PATENT DOCUMENTS 4,264,347 4/1981 Shintani .................. 65/DIG. 16

FOREIGN PATENT DOCUMENTS

| 3031160 | 4/1982 | Fed. Rep. of Germany .... 65/DIG. 16 |
| 56-84328 | 7/1981 | Japan .................. 65/DIG. 16 |
| 60-11244 | 1/1985 | Japan .................. 65/DIG. 16 |
| 2037273 | 7/1980 | United Kingdom . |

OTHER PUBLICATIONS

Patent Abstracts of Japan, Unexamined Applications C Field, vol. 4, No. 113, Aug. 13, 1980.

*Primary Examiner*—Kenneth M. Schor
*Attorney, Agent, or Firm*—Cushman, Darby & Cushman

[57] ABSTRACT

A rod-in-tube method for producing a glass preform for use in the fabrication of an optical fiber, which comprises steps of inserting a glass rod constituting a core material in a glass tube constituting a cladding material, heating the rod-tube composite by an outer heating source with introducing, in the gap between the rod and the tube, a gaseous mixture containing a silicon halogenide, a fluorine-containing compound and oxygen gas in which a ratio of silicon and fluorine (Si/F) is larger than 1/300 and smaller than 1/5, and heating and fusing the composite at a temperature not lower than 1,900° C. with filling the gap by a gaseous mixture comprising a halogen-containing compound and oxygen gas; from which glass preform, an optical fiber with low attenuation of light transmission, particularly in a long wavelength range, is fabricated.

5 Claims, 1 Drawing Sheet

METHOD FOR PRODUCING GLASS PREFORM FOR OPTICAL FIBER

This is a continuation of application Ser. No. 847,319, filed Apr. 2, 1986, which was abandoned upon the filing hereof.

FIELD OF THE INVENTION

The present invention relates to a method for producing a glass preform for an optical fiber with low attenuation of light transmission.

BACKGROUND OF THE INVENTION

A rod-in-tube method is one of typical methods for producing a glass preform for use in the fabrication of an optical fiber and comprises steps of inserting a glass rod constituting a core in a glass tube constituting an cladding having a lower refractive index than the core and heating and fusing the tube and the rod to collapse a gap between them and to integrate them. The glass preform produced by the rod-in-tube method has, however, several drawbacks such that an interface between the core and the cladding tends to have many defects such as bubbles and impurities so that the optical fiber fabricated from the glass preform has large attenuation of light transmission.

To overcome the above drawback of the rod-in-tube method, it was proposed to supply and oxidize a gaseous mixture of a metal halide and oxygen so as to deposit the decomposed product on the outer surface of the rod and the inner surface of the tube (cf. Japanese Patent Publication No. 46898/1984).

It was also proposed to supply a glass-forming raw material containing at least one of fluorine or boron together with oxygen gas in the gap between the rod and tube and heating them to form a quartz glass layer having a lower refractive index than that of the glass rod on the surface of the rod and the inner surface of the glass tube (cf. Japanese Patent Kokai Publication (unexamined) No. 135810/1979).

In addition, it was proposed to inject a gaseous treating agent for modifying the glass surface in the gap between the tube and the rod before fusing them and collapsing the gap between them, which agent does not contain any material having a higher boiling or sublimating temperature than the fusing temperature of the glass (e.g. silicon halide) and can be evaporated before substantially complete fusing of the rod and tube (cf. Japanese Patent Publication Nos. 6261/1984 and 52935/1983).

However, it has been found that when a single mode optical fiber with large capacity to be used for telecommunication at a wavelength range of 1.3 to 1.6 $\mu$m is fabricated from the glass preform produced by each one of the methods disclosed in said Japanese Patent Publications, it is impossible to fabricate any optical fiber having attenuation of light transmission of less than 0.5 dB/km at a wavelength of longer than 1.3 $\mu$m since absorption loss due to the hydroxyl groups and scattering loss due to interfacial defects between the core and the cladding are large.

As the result of the extensive study by the present inventors, it has been found that sources of the hydroxyl groups are water which is diffused and chemically adsorbed on the surfaces of the glass tube and rod and moisture contained in an atmosphere between the tube and the rod, so that the interfacial area between the cladding and the core of the optical fiber contains the hydroxyl group in a high concentration.

Particularly, according to the methods disclosed in Japanese Patent Publication Nos. 6261/1984 and 52953/1983, when the rod-tube composite is thermally treated before collapsing the gap in the presence of the treating agent including a fluorine-containing compound (e.g. $SF_6$ and $CCl_2F_2$), the hydroxyl groups chemically adsorbed on the surface of the rod and the inner surface of the tube are removed by the etching effect of the treating agent. However, when the composite is heated at a temperature lower than 1900° C. at which the rod is not deformed, the surface of the rod and the inner surface of the tube are roughened and the glass becomes opaque like ground glass. If such the surface roughened rod is fused together with the tube to form a transparent glass preform, the optical fiber fabrication from the preform has structural defects at the interface between the cladding and the core, which results in increase of attenuation of light transmission. On the contrary, when the rod-tube composite is heated before fusing it in the presence of a treating agent not containing fluorine (e.g. $SOCl_2$ and $CCl_4$), the hydroxyl groups still remain in a high concentration at the interface between the cladding and the core of the fabricated optical fiber since such treating agent has no etching effect, this resulting in absorption loss due to the hydroxyl groups.

When the glass layer is formed on the surface of the rod and the inner surface of the tube according to the methods disclosed in Japanese Patent Publication No. 46898/1984 and Japanese Patent Kokai Publication No. 135810/1979, the interface between the cladding and the core of the fabricated optical fiber still contains the hydroxyl groups at a high concentration, when again causes large absorption loss. When the rod-tube composite is integrated with introducing only nitrogen, oxygen or helium in the gap between the rod and the tube, it is difficult to keep a dew point (namely moisture content) constant due to leak in a pipe line and thereby it is difficult to economically fabricate, with good reproducibility, the optical fiber containing the hydroxyl groups in a low concentration and having low attenuation of light transmission at a longer wavelength range

SUMMARY OF THE INVENTION

One object of the present invention is to provide an improved rod-in-tube method for producing a glass preform for use in the fabrication of an optical fiber with low attenuation of light transmission particularly in a long wavelength range.

Another object of the present invention is to provide a rod-in-tube method for producing a glass preform for use in the fabrication of an optical fiber, which prevents the contamination with water or moisture at the interface between the core and the cladding.

Accordingly, the present invention provides a rod-in-tube method for producing a glass preform for use in the fabrication of an optical fiber, which comprises steps of inserting a glass rod constituting a core material in a glass tube constituting a cladding material, heating the rod-tube composite by an outer heating source with introducing, in the gap between the rod and the tube, a gaseous mixture containing a silicon halogenide, a fluorine-containing compound and oxygen gas in which a ratio of silicon and fluorine (Si/F) is larger than 1/300 and smaller than 1/5, and heating and fusing the composite at a temperature not lower than 1,900° C. with filling the gap by a gaseous mixture comprising a halogen-containing compound and oxygen gas.

DETAILED DESCRIPTION OF THE INVENTION

Figure 1:
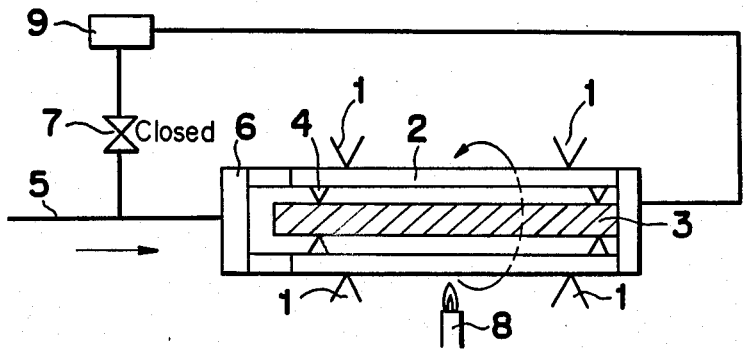
FIGS. 1 and 2 schematically illustrate a preferred embodiment of the rod-in-tube method according to the present invention.

Specific examples of the silicon halogenide are $SiCl_4$, $SiBr_4$, $SiF_4$, $Si_2F_6$, $Si_2Cl_6$, $SiFCl_3$, $SiF_2Cl_2$ and their mixture.

Specific examples of the fluorine-containing compounds are $CCl_2F_2$, $CF_4$, $SF_6$, $F_2$, $SO_2F_2$ and the like.

Specific examples of the halogen-containing compound are fluorine-containing ones such as the above described ones, $SiF_4$, $NF_3$, and chlorine-containing ones such as $Cl_2$, $CCl_4$ and $SOCl_2$, and mixtures thereof. The chlorine-containing compound may be used as a dehydrating agent in the preheating step.

According to the method of the present invention, since, before collapsing the gap between the rod and tube, the composite is heated with introducing the gaseous mixture comprising the silicon halogenide, the fluorine-containing compound and oxygen gas in the gap between the rod and the tube, not only the moisture, dusts and impurities present on the surfaces of the rod and the tube are removed in the form of a volatile halogenide but also the hydroxyl groups are removed together with the etching of the surfaces of the rod and the tube. The use of the mixture containing the silicon halogenide and the fluorine-containing compound according to the present invention can prevent or suppress the formation of rough surfaces due to etching which is found in the conventional methods so that the optical fiber fabricated from the glass preform produced by the present invention has no structural defect between the cladding and the core which causes light scattering. The exact reason for this has not been known but may be assumed as follows:

When the hydrogen groups is removed from the glass surface by the fluorine-containing compound, simultaneously, the fine particles of glass formed from silicon of the silicon halogenide and oxygen are deposited on the glass surface to reduce the surface roughness to such an extent that it can be smoothened by the viscous flow of glass melt during collapsing the gap between the rod and tube.

For example, by using $SiCl_4$ as the silicon halogenide and $SF_6$ as the fluorine-containing compound with varying the their ratio ($SiCl_4/SF_6$) as shown in Table, a glass preform was produced and drawn to form an optical fiber. Wavelength characteristics of attenuation of light transmission of the optical fiber was examined. In Table, there are shown scattering loss calculated by deducting the Rayleigh scattering term in proportion to $1/\lambda^4$ and increase of absorption due to the hydroxyl groups from the value obtained from the wavelength characteristic curve and absorption loss due to the hydroxyl group at $\lambda = 1.38$ $\mu$m. The results for the case in which only $SF_6$ according to the conventional method was used are also shown in Table (No. 6).

TABLE

| No. | $SiCl_4/SF_6$ (sccm) | Si/F (mole) | ($O_2$ = 600 sccm) Scattering loss (dB/km) | OH absorption loss (dB/km) |
|---|---|---|---|---|
| 1 | 300/50 | 1/1 | 0.23 | 37 |
| 2 | 300/250 | 1/5 | 0.19 | 1.5 |
| 3 | 120/200 | 1/10 | 0.09 | 1.2 |
| 4 | 6/300 | 1/300 | 0.21 | 2.0 |
| 5 | 3/300 | 1/600 | 0.63 | 0.9 |
| 6 | 0/300 | — | 0.91 | 0.5 |

As understood from the results of Table, the Si/F ratio has an optimum range and should be larger than 1/300 and smaller than 1/5, namely $1/300 < Si/F < 1/5$. When said ratio is larger than 1/5, the glass deposition mainly proceeds and the etching of the glass surface becomes less effective so that the OH absorption increases. When said ratio is smaller than 1/300, the surface roughness due to etching becomes more deep and remains as the scattering source after integration of the rod-tube composite.

The preheating of the composite before collapsing the gap is carried out preferably at a temperature between 500° and 1,900° C., more preferably between 1,000° to 1,600° C.

After preheating of the composite as described above, the gap between the rod and the tube is filled with the gaseous mixture of the halogen-containing compound and oxygen gas, and the composite is heated at a temperature not lower than 1,900° C. to collapse the gap between the rod and the tube and fuse them together for forming the transparent glass preform. From the glass preform fused at a temperature lower than 1,900° C., only an optical fiber having large scattering loss is fabricated. The presence of oxygen in the gap of the composite decreases the defects of a molecular order at the interface between the core and the cladding of the fabricated optical fiber. If an inert gas such as helium is used in place of oxygen, absorption of light in ultraviolet region by the optical fiber is increased so that attenuation of light transmission in near infrared region is increased due to tailing effect. Therefore, it is necessary to integrate the core-tube composite in an atmosphere containing oxygen to form the glass preform from which an optical fiber for telecommunication with large capacity and low attenuation of light transmission is fabricated.

Since oxygen gas contains a slight amount of water, which prevent the production of the optical fiber containing less hydroxyl groups, it is preferred to add, as the dehydrating agent, the halogen-containing compound as described above.

However, it is not preferred to use a halogen-containing compound such as $BBr_3$, $BCl_3$, $BF_3$, $PCl_3$ and $PF_3$ since it produces a material such as $B_2O_3$ and $P_2O_5$ which significantly absorbs light at a wavelength longer than 1 $\mu$m.

The present invention will be illustrated by way of example with reference to the accompanying drawings.

Figure 2:
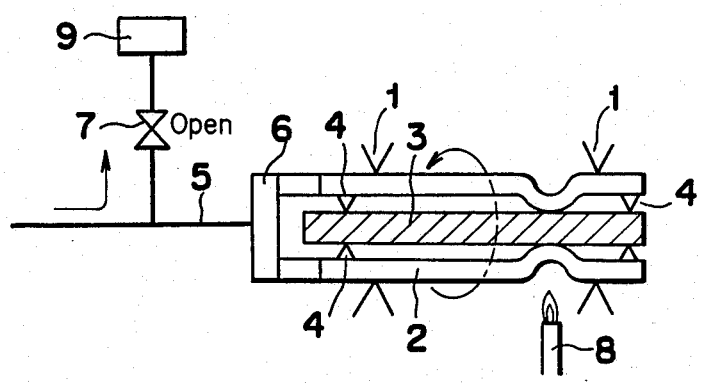

Each numeral in FIGS. 1 and 2 represent a following part;
1: Glass lathe
2: Tube as a cladding material
3: Core material
4: Supporting means
5: Gas inlet
6: Rotary connector
7: Valve 8: Heater
9: Apparatus for treating exhaust gas After inserting the core material (glass rod) 3 in the tube 2, a gaseous mixture of the silicon halogenide, the fluorine-containing compound and oxygen gas is injected in the tube 2 from the inlet 5 and heated at a temperature of 500° to 1,900° C., preferably 1,000° to 1,600° C. During this preheating step, preferably, the tube as the cladding material is rotated at 20 to 80 rpm, and the heater 8 is traveled at a rate of 50 to 250 mm/min. It is preferred to travel the heater back and forth along the composite at least 2 times, more preferably 2 to 10 times.

After such preheating of the tube-core composite, the atmosphere in the gap between the tube 2 and the rod 3 is replaced with the gaseous mixture of the halogen-containing compound and oxygen. The concentration of the halogen-containing compound is preferably at least 3% by volume, more preferably at least 5% by volume.

Then, as shown in FIG. 2, one end portion of the tube 2 is collapsed and fused onto the rod 3 by heating said portion by the heater 8 with rotating the tube 2 and the rod 3 with flowing the gaseous mixture of the halogen-containing compound and oxygen in the gap between them. Just before all the circumferential line of said end portion is fused with the rod, the valve 7 is opened and the flow of the gaseous mixture is adjusted to prevent increase of the pressure in the tube 2.

Thereafter, the heater 8 is traveled along the tube 12 and the rod 13 the gap between which is filled with the gaseous mixture of the halogen-containing compound and oxygen with rotating them to collapse the gap. The pressure in the tube 5 can be decreased by means of the exhausting apparatus 9. However, the pressure in the tube must be kept at such level that the gap is not collapsed at a temperature lower than 1,900° C.

The glass preform produced according to the present invention is drawn to fabricate an optical fiber by any one of conventional methods. In some cases, the glass preform is further jacketed by a quartz tube or a doped quartz tube, or by forming a jacket layer by the chemical vapor deposition method to adjust a ratio of the cladding diameter and the core diameter and then drawn to fabricate an optical fiber.

The present invention will be explained further in detail by following examples.

EXAMPLE 1

A quartz rod containing fluorine was produced by sintering a pure silica soot rod produced by flame hydrolysis (namely, a vapor phase axial deposition (VAD) method) in an atmosphere comprising a fluorine-containing compound according to a conventional method.

The rod was bored at its center to form a OH-free synthetic silica tube for the cladding material having an outer diameter of 25 mm, a length of 40 cm and a refractive index 0.32% lower than that of the pure quartz glass.

The quartz tube was heated to 2,070° C. four times by an oxyhydrogen burner which traveled along the tube at a rate of 50 mm/min. with injecting $SF_6$, $SOCl_2$ and $O_2$ in the tube at rates of 300 ml/min., 70 ml/min. and 600 ml/min., respectively so as to smoothen the inner surface of the tube. Then, a pure silica glass rod having an outer diameter of 3.4 mm was inserted in the bore of the tube. The pure silica tube had been produced by a vapor phase axial deposition method and drawn to said diameter with heating by a resistance heater followed by chemically washing with a mixture of hydrofluoric acid and ethanol and then deionized water by means of a ultrasonic cleaning apparatus.

After changing the introduced gaseous mixture to a mixture of $SiCl_4$ at 120 ml/min., $SF_6$ at 200 ml/min., $SOCl_2$ at 70 ml/min. and $O_2$ at 800 ml/min., the composite was heated at 1,460° C. by the heater traveling at a rate of 130 mm/min. five times.

Thereafter, the supply of $SiCl_4$ was terminated and $SF_6$, $SOCl_2$ and $O_2$ were injected at rates of 200 ml/min., 70 ml/min. and 800 ml/min. and the end portion of the tube was fused and closed by the oxyhydrogen burner as shown in FIG. 2. Thus, the gap between the rod and the tube was filled with a gaseous mixture of $SF_6$, $SOCl_2$ and $O_2$. Then, the tube and the rod were heated to 2,140° C. with the oxyhydrogen burner traveling along them at a rate of 3 mm/min. to collapse the gap and integrate the rod and tube.

The produced glass preform was covered with a glass layer by the chemical vapor deposition method so that a ratio of the outer diameter to the core diameter was 125:8 and drawn to fabricate an optical fiber. Its attenuation of light transmission at a wave length of 1.3 μm and 1.55 μm was 0.34 dB/km and 0.17 dB/km, respectively. Loss due to the hydroxyl group was as small as 1.2 dB/km at a wavelength of 1.38 μm.

EXAMPLE 2

A quartz rod containing fluorine was produced by sintering a pure silica soot rod produced by flame hydrolysis (namely, a vapor phase axial deposition (VAD) method) in an atmosphere comprising a fluorine-containing compound according to a conventional method.

The rod was bored at its center to form a OH-free synthetic silica tube for the cladding material having an outer diameter of 25 mm, a length of 40 cm and a refractive index 0.32% lower than that of the pure quartz glass.

The quartz tube was heated to 2,070° C. four times by an oxyhydrogen burner which traveled along the tube at a rate of 50 mm/min. with injecting $SF_6$, $Cl_2$ and $O_2$ in the tube at rates of 300 ml/min., 100 ml/min. and 600 ml/min., respectively so as to smoothen the inner surface of the tube. Then, a pure silica glass rod having an outer diameter of 3.4 mm was inserted in the bore of tube. The pure silica tube had been produced by a vapor phase axial deposition method and drawn to said diameter with heating by a resistance heater followed by chemically washing with a mixture of fluorohydric acid and ethanol and then deionized water by means of a ultrasonic cleaning apparatus.

After changing the introduced gaseous mixture to a mixture of $SiF_4$ at 100 ml/min., $SF_6$ at 100 ml/min., $Cl_2$ at 100 ml/min. and $O_2$ at 1,000 ml/min., the composite was heated at 1,460° C. by the heater traveling at a rate of 160 mm/min. five times.

Thereafter, $SiF_4$, $SF_6$, $Cl_2$ and $O_2$ were injected at rates of 100 ml/min., 100 ml/min., 100 ml/min. and 1,000 ml/min. and the end portion of the tube was fused and closed by the oxyhydrogen burner as shown in FIG. 2. Thus, the gap between the rod and the tube was filled with a gaseous mixture of $SiF_4$, $SF_6$, $Cl_2$ and $O_2$. Then, the tube and the rod were heated to 2,140° C. with the oxyhydrogen burner traveling along them at a rate of 3 mm/min. to collapse the gap and integrate the rod and tube.

The produced glass preform was covered with a glass layer by the chemical vapor deposition method so that a ratio of the outer diameter to the core diameter was 125:8 and drawn to fabricate an optical fiber. Its attenuation of light transmission at a wave length of 1.3 μm and 1.55 μm was 0.32 dB/km and 0.16 dB/km, respectively. Loss due to the hydroxyl group was as small as 0.4 dB/km at a wavelength of 1.38 μm.

COMPARATIVE EXAMPLE 1

In the same manner as in Example 1 but not injecting SiCl$_4$ in the preheating step before collapsing the gap, a glass preform was produced. The fabricated optical fiber had attenuation of light transmission as large as 1.2 dB/km at a wavelength of 1.3 μm, which is not suitable as a telecommunication single mode optical fiber.

COMPARATIVE EXAMPLE 2

In the same manner as in Example 1 except that the tube-core composite was not preheated before collapsing the gap and closing the end portion of the tube and collapsing the gap with flowing SiCl$_4$, SF$_6$, SOCl$_2$ and O$_2$ at rates of 120 ml/min., 200 ml/min., 70 ml/min. and 800 ml/min., respectively, a glass preform was produced. The fabricated optical fiber showed loss due to the hydroxyl group of 85 dB/km at a wavelength of 1.38 μm and scattering loss of 4.3 dB/km.

What is claimed is:

1. A rod-in-tube method for producing a glass preform for use in the fabrication of an optical fiber, which comprises steps of:

inserting a glass rod constituting a core material in a glass tube constituting a cladding material, preheating the rod-tube composite wherein said preheating comprises heating the rod-tube composite using at least two passes along the length of said composite by an outer heating means, the preheating of said two passes being at a temperature at which the rod-tube composite is not collapsed nor fused together in combination with the introduction of, in the gap between the rod and the tube, a gaseous mixture containing a silicon halogenide, a fluorine-containing compound, and oxygen (O$_2$) gas, in which gaseous mixture a ratio of silicon and fluorine (Si/F) is larger than 1/300 and smaller than 1/5, said preheating step being effective to remove moisture, dust, hydroxyl groups and other impurities from the surfaces of the rod and the tube, while inhibiting the formation of etched rough surfaces, further heating the composite to progressively longitudinally collapse the tube onto the rod at a temperature not lower than 1,900° C. and fusing the thus-collapsed composite to provide a diminishing gap between the tube and rod while flushing the diminishing gap with a gaseous mixture comprising a halogen-containing compound and oxygen (O$_2$) gas and continuing said heating and fusing until the composite has been fused into a core-clad preform rod.

2. The rod-in-tube method according to claim 1, wherein the silicon halogenide is at least one selected from the group consisting of SiCl$_4$, SiBr$_4$, SiF$_4$, Si$_2$F$_6$, Si$_2$Cl$_6$, SiFCl$_3$, SiF$_2$Cl$_2$ and their mixture.

3. The rod-in-tube method according to claim 1, wherein the fluorine-containing compounds at least one selected from the group consisting of CCl$_2$F$_2$, CF$_4$, SF$_6$, F$_2$, SO$_2$F$_2$ and their mixture.

4. The rod-in-tube method according to claim 1, wherein the preheating is carried out at a temperature of 500° to 1,900° C.

5. The rod-in-tube method according to claim 1, wherein the preheating is carried out at a temperature of 1,000° to 1,600° C.

* * * * *